Patented Mar. 7, 1950

2,499,363

UNITED STATES PATENT OFFICE 2,499,363

OXYALKYLATED PHENOL-ALDEHYDE DIOLS AND DERIVATIVES THEREOF

Melvin De Groote, University City, and Bernhard Keiser, Webster Groves, Mo., assignors to Petrolite Corporation, Ltd., Wilmington, Del., a corporation of Delaware No Drawing. Application May 31, 1947,
Serial No. 751,628

24 Claims. (Cl. 260—410.5)

This invention relates to new materials or new compositions of matter consisting of oxyalkylated derivatives of diphenylolmethanes prepared from certain phenols and aldehydes, to certain fractionally and totally esterified forms of such oxyalkylated derivatives, and to methods for their preparation. To come within this invention, a product must have the required composition and must be surface-active and hydrophile, i. e., it must be water-soluble, water-dispersible, or self-emulsifiable. Products of the kind disclosed and claimed herein are themselves useful in various arts. In addition, they are useful as intermediates in the preparation of other products, as will be mentioned below.

Our invention requires first the preparation of diphenylolmethanes from certain aldehydes and phenols, in the proportions and under the conditions set out in detail below; and the subsequent oxyalkylation of such parent compounds by the use of certain oxyalkylating agents to produce a principal embodiment of our invention. Such oxyalkylated products are contemplated for use in various arts. They are also useful as intermediates in preparing a second principal embodiment of our invention. They are further useful as intermediates in the preparation of certain derivatives not included in the present invention.

The reagents of this invention may be visualized as substituted methanes, in which two of the four methane carbon valences are satisfied by phenolic residues of specified composition; one of the two remaining positions is occupied by hydrogen; and the last position is occupied either by hydrogen or by a hydrocarbon radical, whether of the alkyl, aryl, aralkyl, acyclic, cyclic, or alicyclic type, depending upon the nature of the aldehydic reactant used. The reagents may likewise be easily visualized as consisting of two modified phenolic residues connected by a methylene or a mono-substituted methylene bridge.

In our reagents, the molecule contains two residues derived from certain di-functional monocyclic and monohydric phenols. Di-functional (di-reactive) phenols, to be suitable as reactants here, must contain one hydrocarbon substituent in the 2,4,6 position. Such hydrocarbon substituent may contain from 4 to 8 carbon atoms.

Phenolic bodies are widely used in resinification processes. In such reactions, the 2,4, and 6 positions of the phenolic ring (numbering from the phenolic hydroxyl group as occupying position 1) are the reactive positions. Since these three positions are full equivalents in such reactions, we shall refer to them herein as the 2,4,6 position, meaning that any one of them is equally intended. (It should be distinctly understood that we do not consider our reagents to be resins, however.) Where all three such positions are occupied by hydrogen, they are obviously all three available in such reactions; and the phenol is termed tri-functional or tri-reactive.

Tri-functional phenols are not usable as phenolic reactants herein. Mono-functional phenols are likewise not included as usable reactants to produce our reagents.

The aldehydic reactant is present for the purpose of supplying the connecting bridge or link between two molecules of the phenol. The proportion of aldehydic reactant is carefully controlled, so as to produce a maximum amount of diphenylolmethane. We have found that if one uses 1 mole of aldehyde for 2 moles of phenol, i. e., the theoretical proportions of reactants, the reaction is inclined to be somewhat short of complete. We have therefore found it advisable to use slightly larger than theoretical proportions of aldehydic reactant, e. g., 1.05 or possibly as much as 1.10 moles of aldehyde for 2 moles of phenol. An appreciably larger proportion of the aldehydic reactant should not be employed, because it is conducive to the formation of molecules containing more than 2 phenolic nuclei each; and these are distinctly not included within the scope of our invention. It appears, however, that some slight excess of aldehyde, of the order stated, is desirable. If a minor proportion of some product containing 3 phenolic nuclei in the molecule happened to be formed in the preparation of our reagent, its presence would not be detrimental to such product's use in the applications stated below. Such impure or, rather, technically pure product is still to be considered as coming within out invention. The same is true if any uncombined excess of phenol happens to be present.

Use of an appreciably smaller ratio of aldehyde to phenol than 1 to 2 merely results in incomplete combination of the phenol, the amount remaining uncombined contributing little or nothing to the value of the product and at the same time raising its cost. Therefore, reactant proportions should be quite closely adhered to, and should be of the order of those just recited above.

Mixtures of the di-functional phenols named below may be employed to produce our reagents, instead of a single member of the specified class.

To be acceptable for use herein, a di-functional phenol must contain a substituent in the 2,4,6 position, which substituent is a hydrocarbon radical. Such hydrocarbon radical may contain from 4 to 8 carbon atoms, e. g., it may be the butyl, amyl, hexyl, heptyl, octyl, cyclohexyl, phenyl, benzyl, cyclobenzyl, styryl, methylbenzyl radical, etc. It may be alkyl, aryl, aralkyl, acyclic, cyclic, or alicyclic. It is sometimes desirable to produce our reagent from a phenol containing an aryl substituent, and subsequently to convert such aryl substituent to a cyclic radical by conventional hydrogenation procedure, e. g., so it may be used where aromatic derivatives are potentially hazardous, as in cosmetics. Any such hydrogenation procedure must of course not destroy necessary functional groups in our products, or the intermediates used to produce them, like the phenolic hydroxyl groups or the alcoholic hydroxyl groups introduced by oxyalkylation, as described below.

The phenols used as reactants to prepare our reagents are specified to be monocyclic phenols, in the sense that they do not contain a condensed or fused ring. The naphthols are specifically excluded from the present application. Our phenols are also required to be monohydric, i. e., they contain only one phenolic hydroxyl group per molecule.

In our products, both phenolic hydroxyl groups present in the parent diphenylolmethane, as prepared from a di-functional phenol of specified type, and an aldehyde, have been replaced by a residue obtained from an alpha-beta low molal alkylene oxide. The alkylene oxides which we may use in preparing our reagents are limited to those containing 4 carbon atoms or less. They consist of ethylene oxide, propylene oxide, butylene oxide, glycide, and methylglycide. Glycide may be considered to be hydroxypropylene oxide; and methylglycide, hydroxybutylene oxide.

Such alkylene oxides react with various substances, including phenols, to introduce one or more divalent alkyleneoxy groups, i. e., ethyleneoxy, —$C_2H_4O$—; propyleneoxy, —$C_3H_6O$—; butyleneoxy, —$C_4H_8O$—, or generally, $C_nH_{2n}O$—; or, in the case of glycide and methylglycide, hydroxypropyleneoxy (—$C_3H_5(OH)O$—) or hydroxybutyleneoxy (—$C_4H_7(OH)O$—), into the phenol molecule. Such alkylene oxide residue is interposed between the phenolic hydroxyl group's oxygen atom and its hydrogen atom. The result of this reaction is to convert the phenolic hydroxyl group into a glycol or hydroxylated glycol radical, one alcoholic hydroxyl group of which has been etherified with the phenolic residue, and the other or others are free to participate in any subsequent desired reactions. Depending upon the proportion of alkylene oxide available and the conditions under which reaction is conducted, it is possible to introduce from 1 to as many as 60 or more alkyleneoxy units at each phenolic hydroxyl group, in this manner. In the present invention, we desire to specify that from 1 to 60 such units may be present for each original phenolic hydroxyl group in our reagents, so long as they retain certain specified properties stated in detail below.

Because glycide and methylglycide are so infrequently employed, we shall confine our subsequent remarks below essentially to ethylene oxide, propylene oxide, and butylene oxide. It must be always remembered that when we speak henceforth of alkylene oxide residues, or illustrate our statements by references to one or more of the three non-hydroxylated members of our class, we none the less always include glycide and methylglycide as full equivalents thereof. Wheen we refer to glycol or polyglycol radicals herein, it is to be understood that hydroxyglycol or hydroxypolyglycol radicals are meant if the reactant is glycide or methylglycide. Glycide is so reactive that its use is not recommended, because of the hazard involved. It nevertheless comes with the purview of our invention. Mixtures of all our alkylene oxide reactants may be used, if desired, instead of any single one of them.

In our simpler products, then, the two phenolic hydroxyl groups of a diphenylolmethane have been converted into two glycol or polyglycol radicals having one free alcoholic hydroxyl group (in the case of glycide- and methylglycide-derived reagents, two or more) each. In our more complex reagents, such free alcoholic groups have been esterified, e. g., with a higher fatty acid, to produce fractional or total esters. Detailed consideration of this phase of our invention is deferred momentarily.

The radical or residue which appears in our reagents as a bridge or link between the two modified phenolic radicals discussed above, is obtained from a suitable reactive aldehyde containing not more than 8 carbon atoms. Such aldehyde may be aliphatic; it may be aromatic; or it may be cyclic. The simplest aldehydic reactant is formaldehyde; and because of its wide availability, low cost, and high reactivity in the present invention, we name it as our generally preferred reactant of this class. Its cyclic polymer, trioxane, may sometimes be employed to advantage. Its homologues, such as acetaldehyde or its polymer paraldehyde, propionaldehyde, butyraldehyde, and heptaldehyde, are obvious equivalents. Aromatic aldehydes like benzaldehyde are usable. Furfuraldehyde, representative of the class of heterocyclic aldehydes, is usable, etc. Obviously, where a material, although an aldehyde, possesses some more reactive functionality than its aldehydic character, it may not react as an aldehyde here, and hence may be unsuitable for use in preparing our reagents. Mixtures of suitable aldehydes containing less than 9 carbon atoms are usable to prepare our reagents.

To summarize the foregoing briefly, our reagents are prepared from diphenylolmethanes which have themselves been obtained from low molal aldehydes and certain di-functional phenols, but not from mono-functional or tri-functional phenols. If procurable commercially, such diphenylolmethanes may be purchased rather than prepared. Such diphenylolmethanes are then subjected to oxyalkylation by means of a low molal oxyalkylating agent, in which process from 1 to 60 alkyleneoxy residues are introduced at each phenolic hydroxyl group, between the oxygen and hydrogen atoms thereof. Such oxyalkylated diphenylolmethanes are themselves an important embodiment of our invention's reagents. Their fractional or total esters, particularly those of high molal monocarboxylic acids, constitute a second important embodiment of our reagents.

Our reagents may be illustrated by the following type formulas:

or

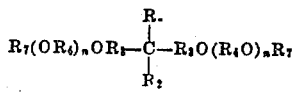

In the first formula, $R_1$ refers to a radical derived from a di-functional phenol in which the hydrocarbon substituent in the 2,4,6 position may possess from 4 to 8 carbon atoms. The two $R_1$ radicals may be the same or they may be different. Each $R_1$ no longer possesses its original phenolic hydroxyl group, the latter having been replaced by residues obtained from alkylene oxide reactants and which possess terminal alcoholic hydroxyl groups, in free or esterified form.

In other words, the radicals $R_1$ may be further detailed as in the second formula shown, where they are seen to consist of the radicals $-R_3O(R_4O)_nR_7$, wherein $R_3$ is the phenolic nucleus containing a substituent hydrocarbon radical, as above defined; $R_4$ is an alkylene or hydroxyalkylene radical, either $-C_2H_4-$, $C_3H_6-$, $-C_4H_8-$, $-C_3H_5(OH)-$, or $-C_4H_7(OH)-$; $n$ is a number between 1 and 60; and $R_7$ is either hydrogen or the acyl radical of a high molal or a low molal monocarboxylic acid, with the limitation that at least one of the two occurrences of $R_7$ must represent the acyl radical of a high molal monocarboxylic acid if either is acyl, as explained further below. $R_2$ in both formulas may be either hydrogen or an organic radical containing 7 carbon atoms or less; but at least one occurrence must represent hydrogen. (Where both occurrences of $R_2$ represent hydrogen, formaldehyde was the parent aldehydic reactant. Where benzaldehyde was the aldehyde employed, the second $R_2$ would represent the $C_6H_5$ radical. If furfuraldehyde were the aldehyde used, the second occurence of $R_2$ would represent the cyclic radical, $C_4H_3O$. If acetaldehyde were used, the second $R_2$ would represent the aliphatic radical, $CH_3$. These examples are illustrative.)

To detail this last generic formula still further, so as to show the phenolic residue in clearer fashion, the following formula is offered:

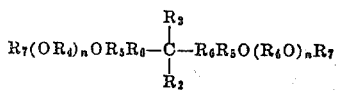

In this formula, one occurence of $R_2$ represents hydrogen and the other occurrence represents either hydrogen or an organic radical, as before. $R_4$ is an alkylene radical or radicals each containing from 2 to 4 carbon atoms (and also containing a hydroxyl group if derived from glycide or methylglycide.) The $n$ occurrences of the alkyleneoxy radical $R_4O$ number between 1 and 60, for each occurence of $n$ shown. $R_5$ is a hydrocarbon radical containing from 4 to 8 carbon atoms and located in the 2,4,6 position of a parent di-functional phenol. $R_6$ is a monocyclic aromatic ring, which may contain a methyl group in either or both the 3 and 5 positions, so long as the phenol is di-functional. $R_7$ represents hydrogen or an acyl radical derived from a monobasic carboxylic acid, with the proviso that if either occurrence of $R_7$ represents an acyl radical, at least one such acyl radical must be that of a high molal monocarboxylic acid.

The level of oxyalkylation employed to produce satisfactory reagents will depend upon a number of factors. In all cases, however, the ultimate product must possess surface-activity and must be hydrophile, to come within our invention. Since ethylene oxide possesses the greatest oxygen-to-carbon ratio of the non-hydroxylated alkylene oxides which are usable, it will ordinarily require fewer moles of it to produce a required level of surface-activity than it would of butylene oxide, for example. For some purposes, however, it may be desirable to employ butylene oxide rather than ethylene oxide, in spite of the above fact. Sometimes an intermediate product may have a somewhat unsatisfactory surface-activity; but this is immaterial so long as the ultimate product, asserted to come within our invention, has the required surface-activity.

For some purposes, such as demulsification of petroleum water-in-oil emulsions, the preferred reagent usually has a relatively high degree of water-solubility. For other uses, lower levels thereof, probably more properly to be termed water-dispersibility or self-emulsifiability, may be preferable. All our reagents are hydrophile, however; and, as such, all possess either water-solubility, water-dispersibility, or self-emulsifiability in water.

The reagents exhibit great versatility and utility as one goes from minimum to maximum hydrophile characteristics in them by varying the proportion of alkylene oxide employed in their preparation. Minimum hydrophile properties may appear, for instance, when about two ethyleneoxy radicals have been introduced for each phenolic hydroxyl group originally present. Such minimum hydrophile property means that the product shows at least self-dispersibility or self-emulsifiability in distilled water at from 30° to 60° C., in concentrations between 0.5% and 5%. Such minimum dispersibility tests are preferably conducted in absence of water-insoluble solvents. Such sol or dispersion should be at least semi-stable, i. e., it should persist for from 30 minutes to 2 hours without showing appreciable separation. Of course, water-insoluble solvents may be present; and if the mixture of reagent and such insoluble solvents is at least semi-stable, then, obviously, the solvent-free reagent would be even more water-dispersible.

The product may be so slowly dispersible, e. g., because of solid or semi-solid character, that it is difficult to prepare such dispersion. In such cases, mixing the product with approximately an equal proportion or less of an alcohol like methyl or ethyl alcohol, or with ethylene glycol diethylether or diethylene glycol diethylether, etc., will result in the formation of a readily dispersible material. The amount of solvent so included in the final aqueous dispersion is insignificant, since the latter is 0.5% to 5% concentrated as to oxyalkylated diphenylolmethane.

Mere visual examination of mixtures of the reagent with water may suffice to indicate surface-activity i. e., the product produces a homogeneous mixture which foams or shows emulsifying power. All these properties are related through adsorption at the interface, for example, at the gas-liquid or the liquid-liquid interface. If desired, surface-activity may be measured in any of the quantitative methods for determining surface and interfacial tension, such as by means of a DuNouy tensiometer or a dropping pipette.

From the standpoint of surface-activity, it will be apparent that the present reagents represent a class of materials differing from each other by small increments, as the oxyalkylating agent and the proportions of oxyalkylating agent are varied. Employing different homologous phenolic reactants and different homologous aldehydic reactants, one is enabled to produce with nicety a product of any desired surface-activity characteristics.

As stated above, among the principal embodiments of our reagents are certain esterified derivatives of the foregoing oxyalkylated diphenylolmethanes, which themselves constitute another important embodiment thereof. Since the oxyalkylated diphenylolmethanes possess at least two alcoholic hydroxyl groups, they are capable of reacting with one mole of an acidic reactant to produce a fractional ester; or with two or more moles of such acidic reactant to produce total esters. Both ester forms are included within the present invention, so long as the acidic reactants employed meet the following specifications. (For simplicity, we are proceeding hereinafter as if the oxyalkylated diphenylolmethanes were derived from a non-hydroxylated alkylene oxide, and therefore as if such product possessed only two alcoholic hydroxyl groups. We have already specified that glycide and methylglycide are suitable oxyalkylating agents to produce our reagents. We repeat that statement now, to make it plain that in some instances our simple oxyalkylated diphenylolmethane products may contain four or more rather than two alcoholic hydroxyl groups.)

The acidic reactant employed to produce such fractional or total ester may be any monobasic carboxylic acid, whether saturated or not, which has 8 carbon atoms and not more than 32. Included among such acceptable acidic reactants are the higher fatty acids, petroleum acids like the naphthenic acids and acids produced by the oxidation of petroleum wax, rosin acids like abietic acid, etc. Of all the acceptable acids of this general class, we prefer to employ the higher fatty acids containing from 8 to 32 carbon atoms. We have found the modified higher fatty acids equivalent to the fatty acids themselves. For example, the chlorinated, brominated, hydrogenated modifications may be substituted for the simple acids. Other modifications are suitable, so long as they retain the fundamental characteristics of the fatty acids, e. g., are capable of forming alkali salts which are soap-like or detergent-like in character. Instead of the acids, the acyl chlorides or acid anhydrides may be employed in the esterification reaction, just as may any other functional equivalents of the free acids. For example, low molal esters of such acids like the methyl or ethyl esters, may be utilized to advantage in some instances. They are effective by virtue of an alcoholysis reaction in which the alkyl group is displaced from the ester by the diphenylolmethane residue, with concomitant liberation of methyl or ethyl alcohol. The use of such low molal esters is attractive, in that any excess thereof, and also the methyl and ethyl alcohol produced in such alcoholysis reaction, may be readily removed from the reaction mass by distillation.

If desired, mixed esters of our diphenylolmethanes may be prepared by using different high molal monocarboxylic acids in the foregoing esterification step. Furthermore, so long as a high molal monocarboxylic acid is employed to esterify at least one of the alcoholic hydroxyl groups of the diphenylolmethane, monocarboxylic acids having fewer than 8 carbon atoms may be employed to esterify the remaining alcoholic hydroxyl group or groups. Acids such as acetic, hydroxyacetic, lactic, butyric, propionic, heptoic, etc. are useful, as are their chlorides, anhydrides, and other obvious equivalents capable of supplying the acyl radical required in the esterification.

Of the ester forms of our reagents, we prefer those prepared from higher fatty acids having 18 carbon atoms, and particularly such higher acids as are unsaturated. Among such fatty acids are oleic, linoleic, linolenic, and ricinoleic acids. If desired, the mixed fatty acids recovered from the splitting of any selected saponifiable fat or oil, such as cottonseed oil, soyabean oil, corn oil, etc., may be employed as the esterifying agent. All such high molal monocarboxylic acids above recited are members of the class of detergent-forming acids, because their alkali salts are soaps or soap-like products. Esters of unsaturated $C-18$ acids with our oxyalkylated diphenylolmethanes are particularly desirable where our reagents are to be used as demulsifiers for resolving petroleum emulsions of the water-in-oil type.

The ester forms of our reagents are useful as intermediates in further reactions, so long as they retain a functional group capable of participating in such reaction. For example, the fractional esters still contain one alcoholic hydroxyl group per molecule, which is susceptible to further esterification. The total esters are likewise often useful in further reactions. For example, conjugated double bonds in the fatty acid residue are reactive, the alcoholic hydroxyl group of the ricinoleic acid residue is reactive, etc.

Having described the reagents of our invention in broad outline, we propose now to consider certain aspects thereof in greater detail.

Our reagents may be prepared in any desirable manner; but ordinarily they are prepared in two or three steps. First, the diphenylolmethane is prepared; then it is oxyalkylated; and finally derivatives of such oxyalkylated products, such as the esters, are prepared from them. Manufacture of the parent diphenylolmethane will be first considered. It usually involves formaldehyde and a phenolic reactant of the kind described in detail above. Condensation reactions of this type are well known and do not require detailed description. We might note that if furfuraldehyde is used as the aldehydic reactant, alkaline condensing agents or catalysts may preferably be employed; otherwise, acidic catalysts are usually preferred. The condensation reactions produce diphenylolmethanes which are oily to vary viscous semi-solids, or even solids, in appearance.

In all cases, substantially 2 moles of phenol are combined with 1 mole of aldehydic reactant. The reactant proportions are usually preferably slightly in excess of 1 mole of aldehyde to 2 moles of phenol, in order to facilitate completion of the reaction, as mentioned above. For example, such ratio may be 1.05 to 2 or 1.1 to 2, or possibly as great as 1.2 to 2, without departing from our invention. Increasing the aldehyde proportion unduly is to be avoided, because it tends to give products containing more than 2 phenolic nuclei in the molecule. Increasing the phenol proportion, i. e., reducing the aldehyde proportion unduly, may result in waste of phenol in that it will remain uncombined with the aldehyde. Such excess is therefore to be avoided. (It will probably become oxyalkylated, however.)

Note that, for our purpose, the resulting diphenylolmethane need be only technically pure. In other words, if it contains even as little as 65 or 70% of the desired diphenylolmethane, the product is frequently acceptable. The remainder, a composition not included within our invention, is usually inert rather than positively harmful. Of course, it may needlessly increase the cost of the product to have less effective or ineffective by-products or uncombined materials present. We naturally prefer to have the highest quality product obtainable. Excess free phenol, if volatile, may be recovered by distillation and employed to make later lots of the product, if desired.

Since the phenolic reactant is water-insoluble and frequently solid, and the preferred aldehydic reactant, formaldehyde, is usually employed as the commercial aqueous solution of 37-40% concentration, we have found it most desirable to employ, in addition to heat and vigorous agitation, a minor proportion of a wetting or emulsifying agent to promote emulsification of the mixture. See U. S. Patent No. 2,330,217, dated September 28, 1943, to Hunn, for examples of such preferred procedure as applied to the manufacture of resins. The following examples illustrate convenient procedures for preparing the diphenylolmethanes containing two phenolic nuclei, which are the parent substances of our reagents. While our products are distinctly not resins, because the latter have different properties and commonly contain 3 or more, and usually 4 or 5 or more phenolic residues, the Hunn procedure noted is applicable here.

DIPHENYLOLMETHANE

Example 1

Mix 300 grams of p-tertiary butylphenol; 81 grams of formaldehyde (37%) (molal ratio, 2 to 1); 100 grams of xylene; 1.5 grams of concentrated hydrochloric acid; and 0.5 gram of Nacconal NRSF (a product of National Aniline Co.) in a vessel equipped with a reflux condenser, stirrer, thermometer, and coils. Heat to 80° C. After the exothermic reaction has subsided, reflux 1 hour. This material, as is well known, is a monoalkyl ($C_{10}$–$C_{20}$, principally $C_{12}$–$C_{14}$) benzene monosulfonic acid sodium salt. Remove water of solution and of reaction, to 160° C. The product is a light-yellow viscous oil. Moleculer weight determination shows about 85–90% of our desired reagent present in the product. The purity may be increased to about 95% by vacuum distillation.

DIPHENYLOLMETHANE

Example 2

Use p-tertiary amylphenol, 328 grams; formaldehyde (37%), 81 grams (molal ratio, 2 to 1); concentrated hydrochloric acid, 1.5 grams; and Nacconal NRSF (a product of National Aniline Co.), 0.5 gram. Heat the mixture to 80° C. After the exothermic reaction subsides, reflux for 1 hour. Add 100 grams of xylene. Remove the water of solution and of reaction by distillation, to 160° C. The product, when solvent-free, is an amber oily liquid, almost butter-like in body. Molecular weight determination shows about 85–90% of our desired reagent present in the product. Purity may be increased to about 93% by vacuum distillation.

DIPHENYLOLMETHANE

Example 3

Use the procedure of the foregoing examples, except substitute p-phenylphenol, in molecular proportions, for the phenols there used. The resulting product, when solvent-free, has physical characteristics similar to those of the foregoing products.

DIPHENYLOLMETHANE

Example 4

Substitute p-cyclohexylphenol for the p-phenylphenol above, using molecular equivalents. In manufacture, the procedure is similar to that of Example 1 above, except that 300 grams of xylene are mixed with the reactants at the beginning of the reaction, because of the higher melting point of the p-cyclohexylphenol. The resulting product, when solvent-free, is clear, reddish-amber in color, soft, tacky, semi-fluid, and sufficiently xylene-dispersible to be satisfactorily oxyalkylated subsequently.

DIPHENYLOLMETHANE

Example 5

Proceed as in the preceding example, except use p-phenylphenol, in molecular proportions. The large amount of solvent was employed as in the preceding example, and for the same reason. The resulting product, when solvent-free, is dark amber in color, soft and tacky, slightly opaque, and sufficiently xylene-dispersible to permit of subsequent oxyalkylation.

DIPHENYLOLMETHANE

Example 6

Use p-cyclohexylphenol, 352 grams; butyraldehyde, 75.6 grams (molal ratio, 2 to 1.05); concentrated sulfuric acid, 4 grams; and xylene, 100 grams. Proceed as follows: Mix the phenol, xylene, and acid in a vessel equipped as in Example 1 above. Introduce the aldehyde slowly into the heated and liquefied mixture. The temperature gradually recedes from an initial value of about 150° C. to about 100–110° C. as water is formed. This is essentially the procedure employed in U. S. Patent No. 2,373,058, dated April 3, 1945, to Silberkraus. The resultant product, when solvent-free, is clear, dark red, soft and tacky, and xylene-soluble.

DIPHENYLOLMETHANE

Example 7

Use p-cyclohexylphenol, 352 grams; heptaldehyde, 119.5 grams (molal ratio, 2 to 1.05); concentrated sulfuric acid, 4 grams; xylene, 100 grams. Proceed as in the preceding example. The product, when solvent-free, is clear, soft, tacky, dark red, and xylene-soluble.

DIPHENYLOLMETHANE

Example 8

Use p-tertiary hexylphenol, 178 grams; formaldehyde (37%), 43 grams (molar ratio, 1 to 0.53); concentrated hydrochloric acid, 2 grams; Nacconal NRSF (a product of National Aniline Co.), 0.8 gram; and xylene, 100 grams. Proceed as in Example 4 above. The product, when solvent-free, is clear, reddish-amber, soft and tacky, and xylene-soluble.

DIPHENYLOLMETHANE

Example 9

Use p-phenylphenol, 340 grams; butyraldehyde, 75.6 grams (molal ratio, 2 to 1); concentrated sulfuric acid, 4 grams; and xylene, 100 grams. Proceed as in Example 6 above. On evaporating the xylene solution of the product, some p-phenylphenol sublimes, showing incompleteness of the reaction. The product, when solvent-free, is reddish-black, quite hard, opaque, and xylene-dispersible.

In general, preparation of the diphenylolmethane may be accomplished merely by reacting the phenol and the aldehyde in absence of added inert solvent. However, if the use to which the final product is to be put does not rule out the use of such solvents, they are often employed to advantage, as shown by the foregoing examples. For example, xylene or high-boiling aromatic petroleum solvent may be included in the reaction mass to reduce its viscosity. On completion of the reaction, it facilitates removal of the water of solution (if the aldehyde was used in aqueous solution) and the water of reaction. We prefer to employ such solvent at this point in the preparation of such of our reagents as are ultimately to be used as demulsifiers, as above noted, because the finished demulsifying agent will probably be required to contain a viscosity-reducing solvent anyway, if it is to be used commercially.

Having prepared the parent diphenylolmethane by the foregoing or other procedures—details of such preparation being well known and also being shown in the examples above, or the materials having been purchased, if obtainable—we next oxyalkylate the material.

Oxyalkylation of such diphenylolmethanes, as above stated, results in the interposition of an alkyleneoxy group or multiples thereof between the original phenolic hydroxyl oxygen atom and its companion hydrogen atom; and the conversion of such original phenolic hydroxyl groups into alcoholic hydroxyl groups. Because such oxyalkylation procedure introduces oxygen atoms into the molecule being treated, in the form of ether linkages, it generally confers increasing water-solubility on such molecule. Particularly, in such cases, it confers increasing water-solubility by small increments, so that substantially any desired level of water-solubility, water-dispersibility, or self-emulsifiability may be conferred simply by controlling the number of alkyleneoxy groups so introduced. For different purposes, it may be desired to have higher or lower levels of oxyalkylation.

For reagents which are effective as demulsifiers for crude oil emulsions of the water-in-oil type, we prefer to employ a relatively high level of oxyalkylation, and prefer to employ ethylene oxide to achieve it. In using ethylene oxide, we have found that in some cases surface-activity and self-emulsifiability begin to appear when there has been added about half as much ethylene oxide as there is diphenylolmethane present, by weight. For some purposes, where hydrophile qualities are desired, but with low water-solubility, such result might be achieved by using smaller proportions of ethylene oxide or by employing some higher alkylene oxide, e. g., butylene oxide, which has a smaller oxygen-to-carbon ratio, and hence confers less water-solubility per molecule added than does ethylene oxide.

Oxyalkylation is a well known procedure. The alkylene oxide is added, either continuously or batchwise, in gaseous or liquid form, to the liquid or molten diphenylolmethane, at a temperature at which the alkylene oxide will be absorbed. While the reaction is an exothermic one, it is usually required to heat the parent diphenylolmethane at the beginning of the reaction, and sometimes throughout it, to temperatures generally lying between 50° and 250° C. Reaction is preferably effected in a closed vessel, capable of withstanding the pressures developed, to prevent loss of alkylene oxide. Pressures are sometimes low, of the order of 10 to 20 p. s. i. gauge; but in some instances, especially in more exhaustive oxyalkylation, pressures of the order of 100 p. s. i., or even 1,000 p. s. i., may be encountered. In some instances, the reaction is so vigorous that cooling must be practised, or the stirring rate must be reduced, to reduce effectiveness of contact and consequent rate of reaction.

Catalysts are preferably employed in this reaction; and alkaline catalysts are more desirable than acidic catalysts. Caustic soda, alkali carbonates, alkali alcoholates like sodium methylate, alkali soaps, etc., may be so used. The amounts employed usually lie between 0.2 and 2% by weight of the diphenylolmethane.

In all instances the proportion of alkylene oxide employed is sufficient to produce self-emulsifiability of the diphenylolmethane. In the case of ethylene oxide, about 0.5 to 2 moles per mole of diphenylolmethane may be required to produce incipient water-dispersibility and surface-activity. Addition of alkylene oxide may be continued to any level desired, for the units of alkylene oxide continue to interpose themselves between the oxygen atom and the hydrogen atom of the free hydroxyl groups present (the first such unit added to each original phenolic hydroxyl group transforming it into an alcoholic hydroxyl group.)

If the oxyalkylated diphenylolmethane is to be used as an intermediate in the preparation of a fractional or total ester, the influence of the esterifying acid on the surface-activity of the resulting ester must be considered. For instance, if one employs an oxyalkylated diphenylolmethane which is itself only marginally surface-active, and esterifies it with a monocarboxylic acid having, for example, 18 carbon atoms, it is possible that the effect of such esterifying acid will be such as to remove the resulting ester from the class of reagents acceptable in our invention, because such ester may exhibit negligible surface-activity. In another case, the intermediate oxyalkylated diphenylolmethane employed in such esterification may show undesirably high and almost true water-solubility; but the effect of the high molal esterifying acid would tend to reduce the water-solubility, and the resulting ester might show more desirable surface-activity for that purpose.

One method of varying the oxyalkylation level is to add a small proportion of alkylene oxide, substantially sufficient to convert only one of the two phenolic hydroxyl groups to an alcoholic hydroxyl group; then to esterify this alcoholic group with the desired high molal acid; and then to revert to oxyalkylation to introduce sufficient alkylene oxide to solubilize the fractional ester to the desired level.

Surface-activity of the reagents of our invention is determinable quantitatively by finding the surface- or interfacial tension of dilute aqueous dispersions, e. g., by means of a DuNouy tensiometer or dropping pipette, etc. A value considerably lower than that of the solution water should be found in dilutions of 1% and less, if the dissolved substance is surface-active. If it were truly dissolved in the water, the values would approximate that of water. Unless the reagent has been solubilized at least to the extent that a dilute aqueous dispersion, e. g., of 0.5% to 5% concentration, exhibits substantial homogeneity for periods of from 30 minutes to 2 hours, it is usually not possible to make a satisfactory measurement of its surface- or interfacial tension. The acceptability of a reagent in our invention is determined by the fact that it has at least sufficient surface-activity to produce an aqueous dispersion of 0.5% to 5% concentration which is substantially stable or at least semi-stable for 30 minutes to 2 hours. At the lower limit of acceptability, therefore, it may be impracticable to make a quantitative measurement of such surface-activity, as just noted. In the present instance, we apply the word "hydrophile" to mean products which exhibit at least such minimum surface-activity as shown by the fact that they are capable of producing, with water, dispersions which are at least of such minimum stability. Insufficiently solubilized reagents are consequently excluded from the scope of our invention.

As examples of methods for preparing oxyalkylated diphenylolmethanes of the present class, we submit the following:

OXYALKYLATED DIPHENYLOLMETHANE

Example 1

The xylene-free products of Example 2, Diphenylolmethane, above (at least 85% pure), 275 grams, is mixed with 88 grams of xylene and 5.5 grams of sodium methylate. Ethylene oxide is added in 100-gram lots. On addition of the first 100 grams, the temperature maximum was 140° C. and the pressure maximum was 65 p. s. i. gauge. In 0.5 hour, a light-amber-colored oil was produced, which, in the presence of the xylene, made a milky water dispersion that separated on standing. Addition of a second 100-gram lot of ethylene oxide, with maximum temperature of 160° C. and maximum pressure of 90 p. s. i., gave, in 3 hours, a non-viscous oil which showed a stable milky dispersion with water. At this point, the ratio of diphenylolmethane to ethylene oxide was 1 to 0.73, by weight; and the product contained 15.6% xylene. Another 100-gram lot of ethylene oxide reacted with maximum temperature of 150 C. and maximum pressure of 160 p. s. i. In 4 hours, a non-viscous oily liquid, emulsifiable in water, was produced. Another 100-gram lot of ethylene oxide, at 153° C. maximum temperature and 110 p. s. i. maximum pressure, after 3.5 hours, produced a material which, although still making a cloudy dispersion in water, was obviously becoming more water-dispersible. A final 100-gram lot of ethylene oxide improved the water-dispersibility of the material slightly.

OXYALKYLATED DIPHENYLOLMETHANE

Example 2

The diphenylolmethane of Examples 1 and 3 to 9, Diphenylolmethane, preceding, are substituted in the oxyalkylation procedure recited immediately above.

OXYALKYLATED DIPHENYLOLMETHANE

Example 3

The diphenylolmethanes of Examples 1 to 9, Diphenylolmethane, above, are used in the oxyalkylation procedure of Example 1, immediately above, except that propylene oxide or butylene oxide is used in place of ethylene oxide.

As previously stated, one of the preferred embodiments of our reagents is the esters, both fractional and total, with high molal monocarboxylic acids. Such esterification is commonly conducted using the free high molal acid, with small proportions of conventional esterification catalysts, e. g., aromatic sulfonic acids, alkylated aromatic sulfonic acids, alkyl phosphoric acids, hydrogen chloride gas, etc., and heating to temperatures somewhat above 100° C. Completeness of the reaction may be followed in such cases by noting the amount of water of reaction which is distillable; or it may be followed by determining the reduction in free carboxyl group. For fractional esters, of course, the proportion of esterifying acid must be limited to the molal proportion required to esterify only a part of the alcoholic hydroxyl groups present. It has already been stated that functional equivalents of the free high molal acids may be employed in this esterification reaction.

FRACTIONAL HIGH MOLAL ESTER OF OXYALKYLATED DIPHENYLOLMETHANE

Example 1

One mole of the oxyalkylated diphenylolmethane produced in "Oxyalkylated diphenylolmethane, Examples 1 to 3," above (at least 85% pure) is reacted with an equi-molar proportion (282 parts) of oleic acid, in xylene solution. After refluxing 1 hour, the vessel containing the mixture is fitted with a sidearm trap and is heated to distill the approximately 18 parts of water produced in the esterification.

FRACTIONAL HIGH MOLAL ESTER OF OXYALKYLATED DIPHENYLOLMETHANE

Example 2

Repeat Example 1 immediately above, except use 298 parts of ricinoleic acid as the esterifying acid.

FRACTIONAL HIGH MOLAL ESTER OF OXYALKYLATED DIPHENYLOLMETHANE

Example 3

Repeat Examples 1 and 2, immediately above, except use 280 parts of linoleic acid or 278 parts of linolenic acid as the esterifying acid.

FRACTIONAL HIGH MOLAL ESTER OF OXYALKYLATED DIPHENYLOLMETHANE

Example 4

Repeat Examples 1 to 3 immediately preceding, except use approximately 275 parts of the mixed fatty acids derived from cocoanut oil as the esterifying acid.

FRACTIONAL HIGH MOLAL ESTER OF OXYALKYLATED DIPHENYLOLMETHANE

Example 5

Repeat Examples 1 to 4 immediately above, except use approximately 280 parts of soyabean fatty acids as the esterifying acid.

When one employs twice as many moles of high molal esterifying acid as of oxyalkylated diphenylolmethane (assuming non-hydroxylated alkylene oxides were used), in the above esterification procedure, total esters are formed. Such total esterification reactions are even easier to conduct than those employed to produce fractional esters, because the presence of excess esterifying acid is not important. It may be removed at the end of the reaction, or it may be allowed to remain in the mass, if its presence is not undesirable in the projected use of the total ester. Employment of the methyl or ethyl ester of the esterifying acid is quite practicable here. The free acids, their acyl chlorides, their anhydrides, etc., may be equally well employed as in the case of the preparation of the fractional esters above.

TOTAL HIGH MOLAL ESTER OF OXYALKYLATED DIPHENYLOLMETHANE

Example 1

Repeat the procedure of "Fractional high molal ester of oxyalkylated diphenylolmethane, Examples 1 to 5," above, except use twice as much of the fatty acid in each case. (Note that four or more times as much high molal acid as in the preceding examples would be required to produce total esters from oxyalkylated diphenylolmethanes prepared from glycide or methylglycide.)

TOTAL HIGH MOLAL ESTER OF OXYALKYLATED DIPHENYLOLMETHANE

Example 2

Repeat Example 1 immediately above, except use an equivalent amount of the respective acyl chloride instead of the free fatty acid in each case. Note that hydrogen chloride, not water, will be the other product of the esterification reaction here.

So long as one of the alcoholic hydroxyl groups of the oxyalkylated diphenylolmethane has been esterified with a high molal monocarboxylic acid, as above illustrated, the remaining such hydroxyl group or groups may be esterified with a low molal monocarboxylic acid, containing 7 carbon atoms or less, to produce a mixed ester. The following examples embody this phase of our reagents.

MIXED ESTER OF OXYALKYLATED DIPHENYLOLMETHANE

Example 1

The fractional esters produced in "Fractional high molal ester of oxyalkylated diphenylolmethanes, Examples 1 to 5," above, are heated with proportions of either acetic acids, hydroxyacetic acid, lactic acid, or butyric acid, sufficient to esterify the remaining free alcoholic hydroxyl groups present in such fractional esters. An equivalent amount of water of esterification is distilled off, after suitable refluxing; and mixed esters of said oxyalkylated diphenylolmethanes are the resulting product.

If a total ester containing the residue of a hydroxylated monocarboxylic acid is desired, it is preferable to produce the fractional ester of any non-hydroxylated acid employed; and to use the latter in the second esterification step. This avoids any possibility of reaction between the hydroxyl group of the hydroxylated acid and the carboxyl group of the other acid, in preference to reaction between the free alcoholic hydroxyl group of the oxyalkylated diphenylolmethane and the non-hydroxylated acid's carboxyl group. For example, if ricinoleic acid and a low molal non-hydroxylated acid are to be esterified, the ricinoleic acid is preferably reacted last.

In the foregoing discussion, no consideration has been given the thought that symmetrical and unsymmetrical forms of oxyalkylated diphenylolmethanes may be prepared. For example, minimum oxyalkylation may be conducted, so as to introduce a total of two moles of alkylene oxide, which convert the two phenolic hydroxyl groups to alcoholic hydroxyl groups. Then, one of the alcoholic hydroxyl groups may be blocked by reacting the partially oxyalkylated product with an acid, e. g., a high molal monocarboxylic acid, to produce a fractional ester. Such fractional ester may then be oxyalkylated further, all of the additional alkylene oxide being added at the other or free alcoholic hydroxyl group. In such case, the esterified hydroxyl group position would possess only one alkylene oxide residue; all others introduced would be located at the other alcoholic hydroxyl group position.

If desired, this same procedure may be applied, but more alkylene oxide introduced in the first oxyalkylation step. In such instance, both alcoholic hydroxyl groups would receive a number of alkylene oxide residues. Esterification at one of such two positions would then prevent any further addition of alkylene oxide there; and any further oxyalkylation must consequently take place at the other position. This latter position would then have more alkylene oxide residues than the first and esterified position; and the product would likewise be unsymmetrical.

Where all oxyalkylation takes place before any esterification, in a single preliminary operation, distribution of alkylene oxide residues between the alcoholic hydroxyl positions will be uniform if the two phenolic nuclei are identical; and symmetrical oxyalkylated esters will result in subsequent esterification.

Materials of the kind herein disclosed are useful in many arts. They may be used as wetting, detergent and leveling agents in the laundry, textile and dyeing industries; as wetting agents and detergents in the acid-washing of fruit and in the acid-washing of building stone and brick; as a wetting agent and spreader in the application of asphalt in road building and the like; as a constituent of soldering flux preparations; as a flotation agent in the flotation separation of various minerals; for flocculating and coagulating negatively-charged particles from various aqueous suspensions such as sewage, coal-washing waste water, various trade wastes, and the like; as germicides and insecticides; as emulsifiers for cosmetics, spray oils, water-repellent textile finishes, etc. The aforementioned uses are by no means exhaustive as to industrial uses. The most important use of our new composition of matter is as a demulsifier for dehydrating water-in-oil emulsions, and more specifically emulsions of water or brine in crude petroleum.

The chemical reagents herein described are also particularly desirable for use as break inducers in the doctor treating procedure for sweetening gasoline. (See U. S. Patent No. 2,157,223, dated May 9, 1939, to Sutton.)

Chemical compounds of the kind herein described are also of value as surface tension depressants in the acidization of calcareous oil-bearing strata by means of strong mineral acid, like hydrochloric acid. As to this use, see U. S. Patent No. 2,233,383, dated February 24, 1941, to De Groote and Keiser. Similarly, some members are effective as surface tension depressants or wetting agents in the working of depleted oil-bearing strata by flooding, in secondary recovery operations. As to this last named use, see U. S. Patent No. 2,226,119, dated December 24, 1940, to De Groote and Keiser.

We have prepared a number of representative oxyalkylated diphenylolmethanes and esters thereof, as described herein. We have tested such representative oxyalkylated diphenylolmethane products and their esters, as herein described, and have found them to be effective demulsifiers for oil-field emulsions of the water-in-oil type. We have additionally determined that such oxyalkylated products and their esters are valuable for purposes where surface-active agents are conventionally employed. We have also determined that the oxyalkylated products and their esters herein described can be used as intermediates for the manufacture of more complicated derivatives.

While the examples show a number of representative usable phenols, it may be well to describe our preferred tri-functional phenolic reactants here. These are prepared from the phenolic compositions present in or derived from the oils extracted from the anacardium genus of the anacardiaceae family. Cashew nutshell liquid is described as consisting of about 90% anacardic acid, $C_{22}H_{32}O_3$, and 10% cardol, $C_{32}H_{52}O_4$, with very small fractional percentages of other materials. Anacardic acid is generally accepted to be:

Pyrolytic distillation causes conversion into phenols. Our reagents may be obtained from cashew nutshell liquid, anacardol (3-pentadecadienylphenol), cardanol (dihydroanacardol or 3-pentadecenylphenol), and hydrogenated cardanol (dihydrocardanol or tetrahydroanacardol or 3-penetadecylphenol). Commercially, these products appear on the market in one of three forms: cardanol, treated cashew nutshell liquid, and hydrogenated cardanol.

As an example of a diphenylolmethane prepared from one such tri-functional phenol, and suitable for subsequent oxyalkylation, the following directions may be given: Use cardanol, 576 grams; formaldehyde (37%), 81 grams (molal ratio, 2 to 1); concentrated hydrochloric acid, 4 grams; Nacconal NRSF (a product of National Aniline Co.), 1.5 grams. Proceed as in Example 1, "Diphenylolmethane," above, except that the xylene is added just before water is distilled. The product, when solvent-free, is dark red, soft or semi-fluid, and xylene-soluble.

Attention is directed to the fact that the present application is one of a series, Serial Nos. 751,600, 751,601, 751,602, 751,603, 751,604, 751,614, 751,615, 751,616, 751,618, 751,621, 751,622, 751,625, 751,626, 751,627 and 751,629, all filed of even date, and all relating to kindred subject-matter. Applications Nos. 751,614, 751,615, 751,616, 751,618, 751,621 and 751,622 are now abandoned.

Having thus described our invention, what we claim as new and desire to secure by Letters Patent is:

1. A surface-active oxyalkylated derivative of a diphenylolmethane having the formula:

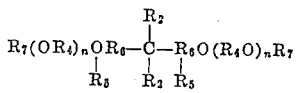

wherein one occurrence of $R_2$ represents hydrogen and the other occurrence represents a member of the class consisting of hydrogen and organic radicals having 7 carbon atoms or less; $R_4$ is a member of the class consisting of alkylene radicals and hydroxyalkylene radicals and contains 4 carbon atoms or less; $R_6$ is a monocyclic phenolic nucleus ortho-linked to the carbon atom C; $R_5$ is a hydrocarbon radical containing from 4 to 8 carbon atoms and located in the para position of the phenolic nucleus $R_6$; $R_7$ is a member of the class consisting of hydrogen, acyl radicals of monocarboxylic acids containing from 8 to 32 carbon atoms, and acyl radicals of monocarboxylic acids containing less than 8 carbon atoms, with the proviso that if either occurrence of $R_7$ represents an acyl radical, at least one such occurrence must represent the acyl radical of a monocarboxylic acid containing from 8 to 32 carbon atoms; and $n$ is a number between 1 and 60; with the final proviso that said derivative, in absence of water-insoluble solvents, is surface-active to the extent that it is capable of forming at least a semi-stable aqueous dispersion in 0.5% to 5% concentration, said surface-activity being due to oxyalkylation in the phenolic hydroxyl position.

2. The product of claim 1, wherein one occurrence of $R_2$ represents hydrogen and the other occurrence of $R_2$ represents an aliphatic radical.

3. The product of claim 1, wherein both occurrences of $R_2$ represent hydrogen.

4. The product of claim 1, wherein both occurrences of $R_2$ represent hydrogen, and $R_4$ is the ethylene radical $C_2H_4$.

5. The product of claim 1, wherein both occurrences of $R_2$ represent hydrogen; $R_4$ is the ethylene radical $C_2H_4$; and both occurrences of $n$ represent the same number.

6. The product of claim 1, wherein both occurrences of $R_2$ represent hydrogen; $R_4$ is the ethylene radical $C_2H_4$; both occurrences of $n$ represent the same number; and $R_5$ is a hydrocarbon radical containing 6 carbon atoms and located in the 2,4,6 position of the phenolic nucleus $R_6$.

7. The product of claim 1, wherein both occurrences of $R_2$ represent hydrogen; $R_4$ is the ethylene radical $C_2H_4$; both occurrences of $n$ represent the same number; and $R_5$ is a hydrocarbon radical containing 7 carbon atoms and located in the 2,4,6 position of the phenolic nucleus $R_6$.

8. The product of claim 1, wherein both occurrences of $R_2$ represent hydrogen; $R_4$ is the ethylene radical $C_2H_4$; both occurrences of $n$ represent the same number; and $R_5$ is a hydrocarbon radical containing 8 carbon atoms and located in the 2,4,6 position of the phenolic nucleus $R_6$.

9. The product of claim 1, wherein one occurrence of $R_7$ represents hydrogen and the other occurrence of $R_7$ represents the acyl radical of a monocarboxylic acid containing from 8 to 32 carbon atoms.

10. The product of claim 1, wherein one occurrence of $R_2$ represents hydrogen; the other occurrence of $R_2$ represents an aliphatic radical; one occurrence of $R_7$ represents hydrogen; and the other occurrence of $R_7$ represents the acyl radical of a monocarboxylic acid containing from 8 to 32 carbon atoms.

11. The product of claim 1, wherein both occurrences of $R_2$ represent hydrogen; one occurrence of $R_7$ represents hydrogen; and the other occurrence of $R_7$ represents the acyl radical of a monocarboxylic acid containing from 8 to 32 carbon atoms.

12. The product of claim 1, wherein both occurrences of $R_2$ represent hydrogen; $R_4$ is the ethylene radical $C_2H_4$; one occurrence of $R_7$ represents hydrogen; and the other occurrence of $R_7$ represents the acyl radical of a monocarboxylic acid containing from 8 to 32 carbon atoms.

13. The product of claim 1, wherein both occurrences of $R_2$ represent hydrogen; $R_4$ is the ethylene radical $C_2H_4$; one occurrence of $R_7$ represents hydrogen; the other occurrence of $R_7$ represents the acyl radical of a monocarboxylic acid containing from 8 to 32 carbon atoms; and both occurrences of $n$ represent the same number.

14. The product of claim 1, wherein both occurrences of $R_2$ represent hydrogen; $R_4$ is the ethylene radical $C_2H_4$; one occurrence of $R_7$ represents hydrogen; the other occurrence of $R_7$ represents the acyl radical of a monocarboxylic acid containing from 8 to 32 carbon atoms; both occurrences $n$ represent the same number; and $R_6$ is a hydrocarbon radical containing 6 carbon atoms.

15. The product of claim 1, wherein both occurrences of $R_2$ represent hydrogen; $R_4$ is the ethylene radical $C_2H_4$; one occurrence of $R_7$ represents hydrogen; the other occurrence of $R_7$ represents the acyl radical of a monocarboxylic acid containing from 8 to 32 carbon atoms; both occurrences of $n$ represent the same number; and $R_5$ is a hydrocarbon radical containing 7 carbon atoms.

16. The product of claim 1, wherein both occurrences of $R_2$ represent hydrogen; $R_4$ is the ethylene radical $C_2H_4$; one occurrence of $R_7$ represents hydrogen; the other occurrence of $R_7$ represents the acyl radical of a monocarboxylic acid containing from 8 to 32 carbon atoms; both occurrences of $n$ represent the same number; and $R_5$ is a hydrocarbon radical containing 8 carbon atoms.

17. The product of claim 1, wherein one occurrence of $R_7$ represents the acyl radical of a monocarboxylic acid containing from 8 to 32 carbon atoms; and the other occurrence of $R_7$ represents the acyl radical of a monocarboxylic acid containing from 1 to 32 carbon atoms.

18. The product of claim 1, wherein one occurrence of $R_2$ represents hydrogen; the other occurrence of $R_2$ represents an aliphatic radical; one occurrence of $R_7$ represents the acyl radical of a monocarboxylic acid containing from 8 to 32 carbon atoms; and the other occurrence of $R_7$ represents the acyl radical of a monocarboxylic acid containing from 1 to 32 carbon atoms.

19. The product of claim 1, wherein both occurrences of $R_2$ represent hydrogen; one occurrence of $R_7$ represents the acyl radical of a monocarboxylic acid containing from 8 to 32 carbon atoms; and the other occurrence of $R_7$ represents the acyl radical of a monocarboxylic acid containing from 1 to 32 carbon atoms.

20. The product of claim 1, wherein both occurrences of $R_2$ represent hydrogen; $R_4$ is the ethylene radical $C_2H_4$; one occurrence of $R_7$ represents the acyl radical of a monocarboxylic acid containing from 8 to 32 carbon atoms; and the other occurrence of $R_7$ represents the acyl radical of a monocarboxylic acid containing from 1 to 32 carbon atoms.

21. The product of claim 1, wherein both occurrences of $R_2$ represent hydrogen; $R_4$ is the ethylene radical $C_2H_4$; one occurrence of $R_7$ is the acyl radical of a monocarboxylic acid containing from 8 to 32 carbon atoms; the other occurrence of $R_7$ represents the acyl radical of a monocarboxylic acid containing from 1 to 32 carbon atoms; and both occurrences of $n$ represent the same number.

22. The product of claim 1, wherein both occurrences of $R_2$ represent hydrogen; $R_4$ is the ethylene radical $C_2H_4$; one occurrence of $R_7$ is the acyl radical of a monocarboxylic acid containing from 8 to 32 carbon atoms; the other occurrence of $R_7$ represents the acyl radical of a monocarboxylic acid containing from 1 to 32 carbon atoms; both occurrences of $n$ represent the same number; and $R_5$ is a hydrocarbon radical containing 6 carbon atoms.

23. The product of claim 1, wherein both occurrences of $R_2$ represent hydrogen; $R_4$ is the ethylene radical $C_2H_4$; one occurrence of $R_7$ is the acyl radical of a monocarboxylic acid containing from 8 to 32 carbon atoms; the other occurrence of $R_7$ represents the acyl radical of a monocarboxylic acid containing from 1 to 32 carbon atoms; both occurrences of $n$ represent the same number; and $R_5$ is a hydrocarbon radical containing 7 carbon atoms.

24. The product of claim 1, wherein both occurrences of $R_2$ represent hydrogen; $R_4$ is the ethylene radical $C_2H_4$; one occurrence of $R_7$ is the acyl radical of a monocarboxylic acid containing from 8 to 32 carbon atoms; the other occurrence of $R_7$ represents the acyl radical of a monocarboxylic acid containing from 1 to 32 carbon atoms; both occurrences of $n$ represent the same number; and $R_5$ is a hydrocarbon radical containing 8 carbon atoms.

MELVIN DE GROOTE.
BERNHARD KEISER.

REFERENCES CITED

The following references are of record in the file of this patent:

UNITED STATES PATENTS

| Number | Name | Date |
|---|---|---|
| 1,990,985 | Fonrobert et al. | Feb. 12, 1935 |
| 2,330,474 | De Groote | Sept. 28, 1943 |
| 2,331,265 | Coleman | Oct. 5, 1943 |
| 2,385,970 | DeGroote | Oct. 2, 1945 |